July 14, 1936.    M. SASSOLI    2,047,521
PROJECTING APPARATUS
Filed July 2, 1935    3 Sheets-Sheet 1

INVENTOR
Mario Sassoli
BY Mock & Blum
ATTORNEYS

July 14, 1936. M. SASSOLI 2,047,521
PROJECTING APPARATUS
Filed July 2, 1935 3 Sheets-Sheet 2
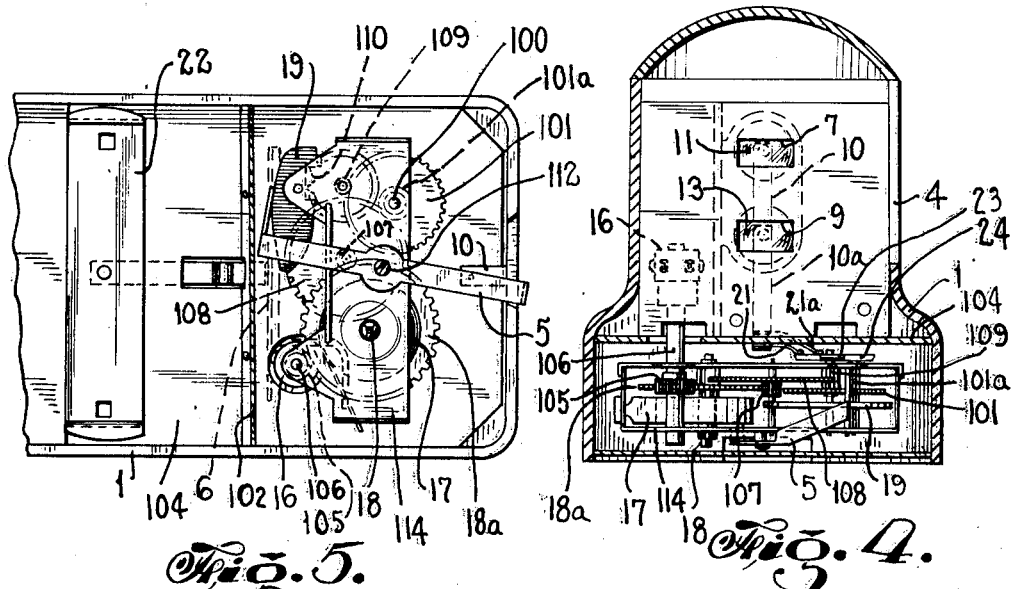
Fig. 5. Fig. 4.
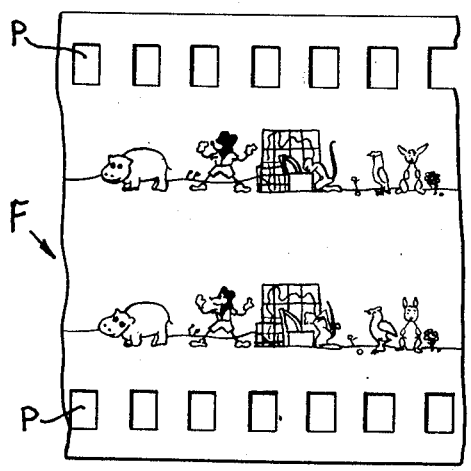
Fig. 6.
Fig. 7.
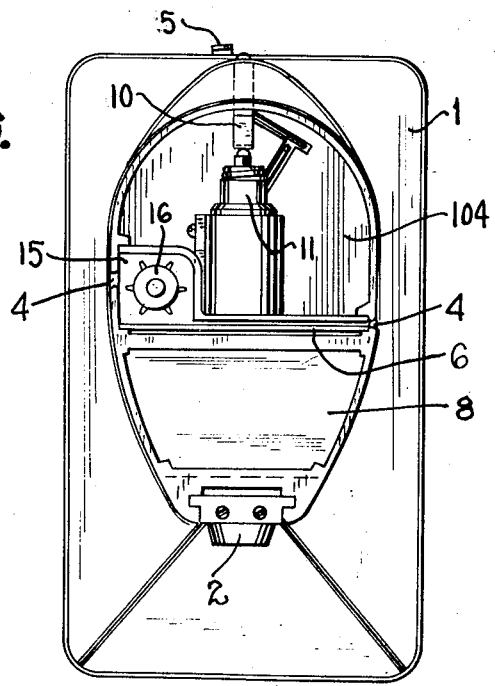
INVENTOR
Mario Sassoli
BY Mock & Blum
ATTORNEYS July 14, 1936.  M. SASSOLI  2,047,521

PROJECTING APPARATUS

Filed July 2, 1935  3 Sheets-Sheet 3

INVENTOR
Mario Sassoli
BY Mock & Blum
ATTORNEYS

UNITED STATES PATENT OFFICE 2,047,521

PROJECTING APPARATUS

Mario Sassoli, Milan, Italy

Application July 2, 1935, Serial No. 29,527
In Germany March 21, 1935

6 Claims. (Cl. 88—16.6)

The object of the present invention is a small projection apparatus and a film designed for use therewith.

This apparatus differs from those previously known, by its simplicity of construction and operation, and by its minimum dimensions. Said apparatus may be used with a film which is made of celluloid or other material.

An embodiment of the invention is illustrated, as an example thereof, in the accompanying drawings.

Fig. 4 is a sectional view on the line 4—4 of Fig. 2.

Fig. 5 is a bottom plan view of the device, this view being partially in section.

Fig. 6 is a top plan view of the apparatus, with the cover of the device removed.

Fig. 7 is an elevation of a portion of the film, showing the two separate rows of pictures.

Figure 1:
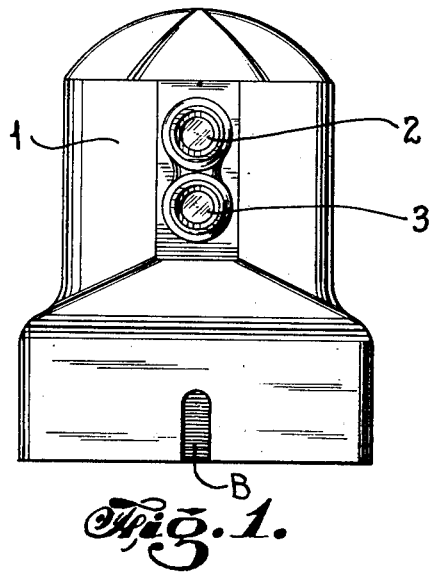
Fig. 1 is a front elevation of the improved apparatus.
Figure 3:
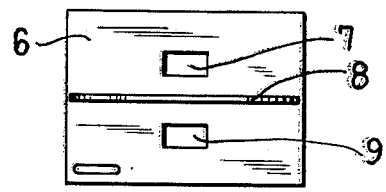
Fig. 3 is an elevation of the rear wall of the projection chamber.

The apparatus consists of a casing 1, having an upper and lower lens, or system of lenses 2 and 3. Said casing has slots 4 whereby the film F can be passed between the light chamber of the apparatus, and the projection chamber thereof.

5 is a manually operated control lever, 6 is a vertical partition between the projection chamber and the light chamber, and 8 is a horizontal wall or partition which is located in the projection chamber. The horizontal wall or partition 8 divides the projection chamber into an upper chamber and into a lower chamber, corresponding to the upper and lower openings or windows 7 and 9 which are provided in the vertical partition 6. The first chamber is on the same level as the upper electric lamp 11, and the second chamber is on a level with the lower electric lamp 13.

Figure 8:
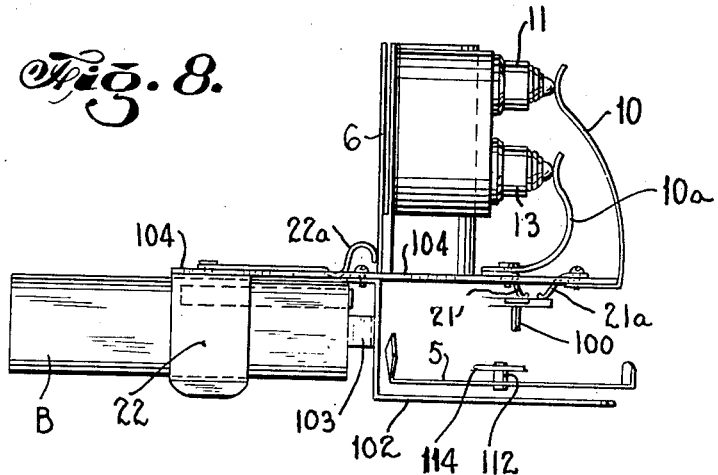
Fig. 8 is an elevation showing the essential parts of the circuit-controlling means.
Figure 9:
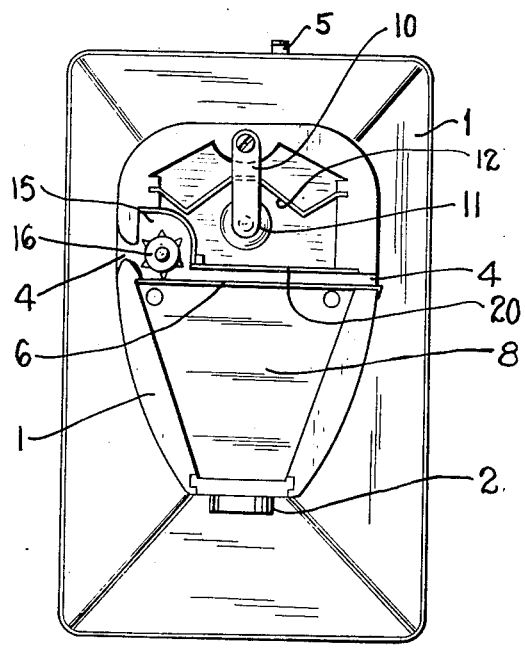
Fig. 9 is a top plan view of the apparatus, with the cover removed, showing the reflectors and other details.
Figure 10:
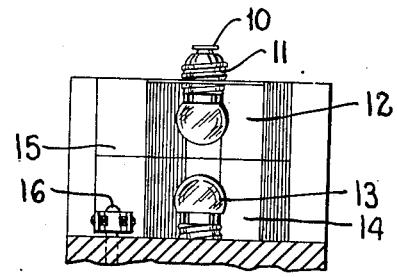
Fig. 10 is a detail sectional view, partially in elevation, showing the two lamps, the reflectors, and other details.

These lamps 11 and 13 may be bulbs of the usual type. The bulb or lamp 11 has a contact plate 10, and the device also has two resilient contact plates 21 and 21a, as shown in Fig. 8.

The lamps 11 and 13 are respectively provided with angular reflectors 12 and 14.

Figure 2:
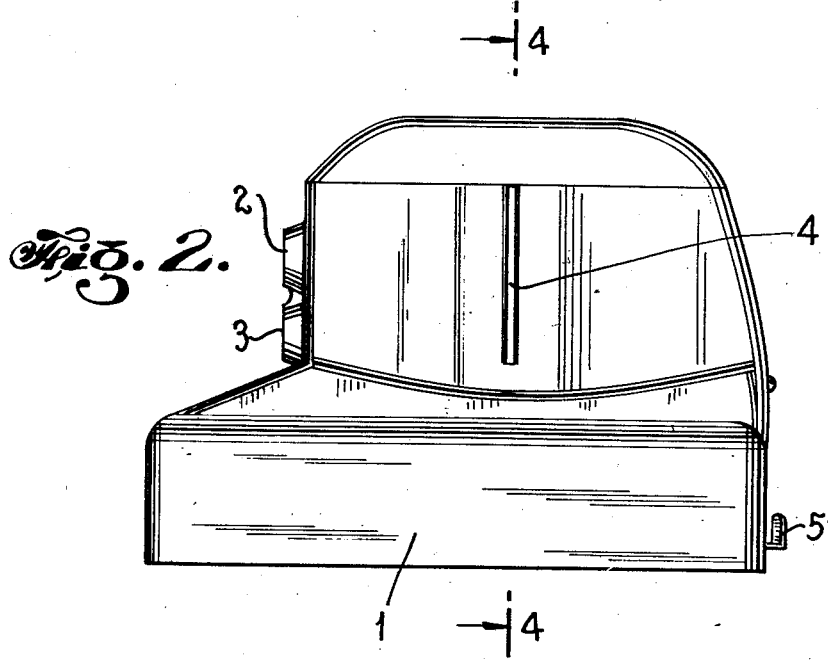
Fig. 2 is a side elevation thereof.

15 is a recess which is provided between the projection chamber and the light chamber. The feed-drum 16 is located in said recess 15, and said feed-drum 16 has teeth which engage one of the rows of perforations P, which are provided in the film F. For convenience it is assumed that the device is held in the horizontal position which is shown in Fig. 1 and Fig. 2.

The feed-drum 16 actuates the film in a horizontal path, so that the upper and lower rows of pictures which are illustrated in Fig. 7, respectively pass behind the openings or windows 7 and 9.

The member 16 is actuated by means of a spring motor which is operated by means of a spring 17. This spring 17 is wound up by means of the shaft or stem 18. The movement of the spring motor is controlled by a pivoted ratchet-stop 19, which can engage a gear 110 which is operated by said spring motor. A frosted glass disc 20 is located in front of the lamps 11 and 13.

A battery B can be located in the apparatus and said battery can have one terminal thereof connected to a contact plate 22, which is provided with an extension 22a. Said extension 22a contacts with the metal partition 6. The lamps 11 and 13 are mounted in metal sockets of the usual type, and each said socket contacts with plate 6 and each said socket also contacts with one of the terminals of each of the lamps 11 and 13.

Hence the members 22 and 22a serve to connect the battery B to one terminal of each of the lamps 11 and 13.

Figure 11:
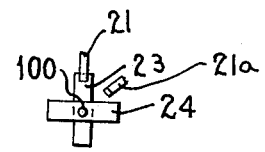
Fig. 11 shows a detail of the switch mechanism for energizing the lamps alternately.

As shown in Fig. 8 and Fig. 11, the apparatus is also provided with two small contact plates 23 and 24, which are perpendicular to each other and which are mounted on the shaft 100. A gear 101 is mounted on shaft 100. Said gear 101 and its shaft 100 are turned when the spring 17 operates the motor.

The motor is released so as to enable it to be turned by the spring 17, by moving the control lever 5, so as to move the stop-device into its inoperative position. When the lever 5 is moved to said position, it contacts with the metal plate 102, which is electrically connected to the second terminal 103 of the battery B. The plate 102 is insulated from the member 6, by means of an intermediate plate 104, which is made of insulating material.

Referring to Figs. 4 and 5, the spring 17 turns the shaft or stem 18 on which the gear 18a is mounted. The gear 18a meshes with the smaller gear 105, on whose shaft 106 the feed-drum 16 is mounted. The gear 18a also meshes with a smaller gear 107, which is mounted on a stud shaft, on which the gear 108 is mounted. The gear 108 meshes with a small gear 101a, on whose shaft the large gear 101 is mounted. The gear 101 meshes with a small gear 109, on whose shaft the gear 110 is mounted. The gear 110 can be engaged by the ratchet stop 19, so as to stop the actuation of the motor.

The lever 5 is pivoted to a frame member of the device, by means of a pin 112.

Each of the lamps 11 and 13 has its second terminal respectively contacting with metal plates 10 and 10a, which are connected to the insulating member 104. The members 10 and 10a are respectively connected to the metal resilient contact members 21a and 21.

The spring motor is mounted in a metal frame member 114, to which the control lever 5 is connected by means of the metal pivot pin 112. Hence the electrical circuit of one of the lamps is closed, when the contact plates 21 and 21a contact with either of the crossed arms 23 and 24, since the control lever 5 electrically connects said metal frame and the gears which are mounted thereon, to the member 102, when said lever 5 is moved to the position in which the spring motor is released.

Referring to Fig. 7, it can be seen that the film F has two rows of pictures. The corresponding superposed of said rows correspond to the same character, in two different positions thereof. Hence, if the superposed pictures of said rows are alternately projected in rapid succession, the projected pictures produce the illusion of the movement of said picture or character. The feed of the film is relatively slow, and it is much slower than the operation of the switch mechanism which is illustrated in Fig. 8 and in Fig. 11. That is, the lamps 11 and 13 are successively and rapidly illuminated, while a pair of superposed pictures are passing slowly in front of the projection lens system.

This form of mechanism makes it unnecessary to employ a shutter so that superior projection is secured.

I have shown a preferred embodiment of my invention, but it is clear that numerous changes and omissions could be made, without departing from its spirit.

I claim:

1. A projection device comprising a pair of projection-lens means, an electric lamp associated with each said projection-lens means, a spring motor, a film-feeding device operated by said spring motor and adapted to feed through said projection device a film having a pair of rows of superposed pictures so that each said row is aligned with one of said projection-lens means, and a switch device operated by said motor and adapted to alternately make and break the respective circuits of said lamps, said motor operating said switch device more rapidly than said film-feeding device, so that each superposed pair of pictures on said film is exposed alternately and a plurality of times while said pictures are aligned with the projection-lens means.

2. A projection device comprising a pair of projection-lens means, an electric lamp associated with each said projection-lens means, a spring motor, a film-feeding device operated by said spring motor and adapted to feed through said projection device a film having a pair of rows of superposed pictures so that each said row is aligned with one of said projection-lens means, and a switch device operated by said motor and adapted to alternately make and break the respective circuits of said lamps, said motor operating said switch device more rapidly than said film-feeding device, so that each superposed pair of pictures on said film is exposed alternately and a plurality of times while said pictures are aligned with the projection-lens means, said spring motor having a movable stop, a manually operable and conducting control device adapted to actuate said stop to its operative and inoperative position, the circuit of said lamps including said control device and also including a conducting member with which said control device contacts when said control device is moved so as to actuate said stop to its inoperative position.

3. A projection device comprising a pair of projection-lens means, an electric lamp associated with each said projection-lens means, a spring motor, a movable stop device for said spring motor, a manually operable control device adapted to actuate said stop device to its operative and inoperative positions, an electric lamp associated with each said projection-lens means, a common terminal member for one terminal of each of said lamps, separate terminal members for the other terminals of said lamps, a revoluble switch device mounted on a shaft of said spring motor, said revoluble switch device having conducting members which contact separately and successively with said separate terminal members, a film-feeding device operated by said spring motor and adapted to feed through said projection device a film having a pair of rows of superposed pictures so that each row is aligned with one of said projection lens means, said film-feeding device being operated more slowly than said switch device, so that each pair of superposed pictures on said film is exposed alternately and a plurality of times while said pictures are aligned with the projection-lens means.

4. A projection device comprising a pair of projection-lens means, an electric lamp associated with each said projection-lens means, a spring motor, a movable stop device for said spring motor, a manually operable control device adapted to actuate said stop device to its operative and inoperative positions, an electric lamp associated with each said projection-lens means, a common terminal member for one terminal of each of said lamps, separate terminal members for the other terminals of said lamps, a revoluble switch device mounted on a shaft of said spring motor, said revoluble switch device having conducting members which contact separately and successively with said separate terminal members, a film-feeding device operated by said spring motor and adapted to feed through said projection device a film having a pair of rows of superposed pictures so that each row is aligned with one of said projection lens means, said film-feeding device being operated more slowly than said switch device, so that each pair of superposed pictures on said film is exposed alternately and a plurality of times while said pictures are aligned with the projection-lens means, the circuits of said lamps also including a common conducting member which contacts with said control device to complete the circuits of said lamps with a source of current, when the control device is moved to actuate the stop device to its inoperative position.

5. A projection device comprising a pair of projection-lens means, an electric lamp associated with each said projection-lens means, terminal means adapted to connect a terminal of each said lamp with one pole of a source of current, separate terminal members adapted to connect with the other terminals of said lamps, said device having a spring motor which is made of conducting material and which is mounted in a frame made of conducting material, said motor and frame being insulated from said terminal means and said terminal members, said motor including a shaft and a switch device on said shaft, a film-feeding device operated by said spring motor, said film-feeding device being adapted to feed through said projection device a film having a pair of rows of superposed pictures, said switch-device contacting successively with said terminal means when its shaft is turned, movable stop-device for said spring motor, a manually operable control device made of conducting material and mounted on the frame of said motor and operable to actuate said stop device to its operative and inoperative positions, and a conducting member with which said control device contacts when said stop-device is in its operative position, said conducting member being adapted to contact with the other pole of said source of current.

6. A projection device comprising a pair of projection-lens means, an electric lamp associated with each said projection-lens means, a spring motor, a film-feeding device operated by said spring motor and adapted to feed through said projection device a film having a pair of rows of superposed pictures so that each said row is aligned with one of said projection-lens means, and a switch device operated by said motor and adapted to alternately make and break the respective circuits of said lamps, said motor operating said switch device more rapidly than said film-feeding device, so that each superposed pair of pictures on said film is exposed alternately and a plurality of times while said pictures are aligned with the projection-lens means, the circuit of each said lamp including said spring motor.

MARIO SASSOLI.